United States Patent
Burrowes et al.

(10) Patent No.: US 7,658,208 B2
(45) Date of Patent: Feb. 9, 2010

(54) KINK, CRUSH, AND BURST RESISTANT FLEXIBLE HOSE CONSTRUCTION

(75) Inventors: Thomas George Burrowes, North Canton, OH (US); David Joseph Maguire, Hudson, OH (US); Douglas Michael Gilg, Lincoln, NE (US); Jenny Zhaoxia Yu, Hudson, OH (US)

(73) Assignee: Veyance Technologies, Inc., Fairlawn, OH (US)

( * ) Notice: Subject to any disclaimer, the term of this patent is extended or adjusted under 35 U.S.C. 154(b) by 422 days.

(21) Appl. No.: 11/633,770

(22) Filed: Dec. 5, 2006

(65) Prior Publication Data

US 2008/0072986 A1    Mar. 27, 2008

Related U.S. Application Data

(63) Continuation-in-part of application No. 11/534,964, filed on Sep. 25, 2006.

(51) Int. Cl.
    *F16L 11/00*      (2006.01)

(52) U.S. Cl. .................. 138/126; 138/125; 138/132

(58) Field of Classification Search .............. 138/125, 138/126, 132
See application file for complete search history.

(56) References Cited

U.S. PATENT DOCUMENTS

| | | | | |
|---|---|---|---|---|
| 1,352,740 | A * | 9/1920 | Egerton | 138/132 |
| 3,047,026 | A * | 7/1962 | Kahn | 138/122 |
| 3,130,753 | A | 4/1964 | Monnen | 138/122 |
| 3,386,877 | A * | 6/1968 | Skochdopole et al. | 428/314.4 |
| 3,872,893 | A | 3/1975 | Roberts | 138/121 |
| 3,885,594 | A | 5/1975 | Tanaka | 138/129 |
| 3,919,026 | A * | 11/1975 | Mizutani et al. | 156/143 |
| 4,140,154 | A * | 2/1979 | Kanao | 138/132 |
| 4,304,266 | A | 12/1981 | Kutnyak et al. | 138/129 |
| 4,350,547 | A | 9/1982 | Kanao | 156/143 |
| 4,587,145 | A | 5/1986 | Kanao | 428/36 |
| 4,668,318 | A | 5/1987 | Piccoli et al. | |
| 4,796,672 | A * | 1/1989 | Kanao | 138/154 |
| 5,702,132 | A | 12/1997 | Friederich et al. | 285/235 |
| 5,765,599 | A | 6/1998 | Hernvall et al. | 138/133 |
| 5,806,567 | A * | 9/1998 | Fukui et al. | 138/132 |
| 5,918,642 | A | 7/1999 | Akedo et al. | 138/132 |
| 6,179,008 | B1 * | 1/2001 | Kawazura et al. | 138/125 |
| 6,227,249 | B1 | 5/2001 | Akedo et al. | 138/137 |

(Continued)

FOREIGN PATENT DOCUMENTS

CA      2390185 A1    2/2004

OTHER PUBLICATIONS

Dow article, "Expanding the Boundaries of Olefin-based Elastomers," Published Jun. 2006.

(Continued)

*Primary Examiner*—James F Hook
(74) *Attorney, Agent, or Firm*—Alvin T. Rockhill; Kathleen K. Bowen

(57) ABSTRACT

A flexible hose construction with kink, crush, and burst resistance. The hose is constructed of a tubular member and a reinforcement strip at least partially embedded in the tubular member. The reinforcement strip is wound in a helical pattern encircling a central lumen of the tubular body. The material forming the reinforcement strip has a greater initial modulus than the material forming the tubular member.

17 Claims, 3 Drawing Sheets

U.S. PATENT DOCUMENTS

| | | | |
|---|---|---|---|
| 6,244,303 B1 | 6/2001 | Adams | 138/129 |
| 6,305,428 B1 * | 10/2001 | Nakamura et al. | 138/126 |
| 6,698,457 B2 | 3/2004 | Hayashi et al. | 138/127 |
| 6,701,968 B2 | 3/2004 | Bolonhezi | 138/132 |
| 6,827,109 B2 | 12/2004 | McCaughtry | 138/134 |
| 7,189,763 B2 * | 3/2007 | Sueda et al. | 521/96 |
| 7,304,118 B2 * | 12/2007 | Lee et al. | 526/348.3 |
| 2001/0018105 A1 * | 8/2001 | Schmitz et al. | 428/36.91 |
| 2004/0265524 A1 | 12/2004 | Wideman et al. | |
| 2006/0004157 A1 | 1/2006 | Arriola et al. | 526/171 |
| 2006/0198983 A1 | 9/2006 | Patel | 428/92 |
| 2006/0199006 A1 | 9/2006 | Poon et al. | 428/364 |
| 2006/0199030 A1 | 9/2006 | Liang et al. | 428/515 |
| 2006/0199744 A1 | 9/2006 | Walton et al. | 508/110 |
| 2006/0199872 A1 | 9/2006 | Prieto et al. | 521/142 |
| 2006/0199884 A1 | 9/2006 | Hoenig et al. | 524/230 |
| 2006/0199887 A1 | 9/2006 | Liang et al. | 524/423 |
| 2006/0199896 A1 | 9/2006 | Walton et al. | 524/543 |
| 2006/0199897 A1 | 9/2006 | Karjala et al. | 524/543 |
| 2006/0199905 A1 | 9/2006 | Hughes et al. | 525/191 |
| 2006/0199906 A1 | 9/2006 | Walton et al. | 525/191 |
| 2006/0199907 A1 | 9/2006 | Chang et al. | 525/191 |
| 2006/0199908 A1 | 9/2006 | Cheung et al. | 525/191 |
| 2006/0199910 A1 | 9/2006 | Walton et al. | 525/192 |
| 2006/0199911 A1 | 9/2006 | Markovich et al. | 525/192 |
| 2006/0199912 A1 | 9/2006 | Fuchs et al. | 525/240 |
| 2006/0199914 A1 | 9/2006 | Harris et al. | 525/242 |
| 2006/0199930 A1 | 9/2006 | Li Pi Shan et al. | 526/346 |
| 2006/0199931 A1 | 9/2006 | Poon et al. | 526/346 |
| 2006/0205833 A1 | 9/2006 | Martinez et al. | 521/142 |
| 2006/0211819 A1 | 9/2006 | Hoenig et al. | 525/88 |
| 2008/0072985 A1 * | 3/2008 | Burrowes et al. | 138/126 |

OTHER PUBLICATIONS

Dow article, "Solid State Structure and Properties of Novel Olefin Block Copolymers," Published Jun. 2006.

Dow article, "Unique Material Properties and Potential Applications of Novel Olefin Block Copolymers," Published Jun. 2006.

Dow article, "The Development of a New Generation of Novel Olefin Block Copolymers: From Molecular Design to Market Development," Published Jun. 2006.

Internet article, "Catalytic Production of Olefin Block Copolymers via Chain Shuttling Polymerization," Published *Science*, May 5, 2006, vol. 312, No. 5774, pp. 714-719.

Internet article, "Polyolefin Shuffle, Repeated Chain Transfer Between Two Catalysts Yields Tailored Block Copolymers," Published *Chemical & Engineering News*, May 8, 2006, vol. 84, No. 19, p. 9.

International Search Report issued in corresponding PCT Application serial No. PCT/US2007/79380 dated Mar. 26, 2008 (2 pages).

David Roylance, "Stress-Strain Curves", Aug. 23, 2001 (14 pages).

http://web.archive.org/web/20050207150444/http://geomembrane.com/TechPapers/PVCMechanical.htm (PVC) Feb. 7, 2005 (1 page).

European Patent Office, International Search Report issued in corresponding International Application serial No. PCT/US2007/086386 dated Apr. 18, 2008.

\* cited by examiner

KINK, CRUSH, AND BURST RESISTANT FLEXIBLE HOSE CONSTRUCTION

CROSS REFERENCE TO OTHER APPLICATIONS

This application is a continuation in part of Ser. No. 11/534,964 filed Sep. 25, 2006.

FIELD OF THE INVENTION

The invention relates generally to flexible hoses and, more particularly, to flexible hoses having a hose construction that is kink, crush, and burst resistant.

BACKGROUND

Conventional flexible hoses have been manufactured for many years, first out of natural rubber and more recently out of petrochemical derivatives such as synthetic rubber, thermoplastic rubbers, or polymers. Conventional flexible hoses commonly have a layered construction consisting of an inner tubular conduit, a spiraled, braided, or knitted reinforcement wrapped about the tubular conduit, and an outer cover.

"Kinking" is a phenomenon that may occur when the hose is doubled over or twisted. A consequence of kinking is that the fluid flow through the hose can be either severely restricted or blocked. Kinking is a nuisance that causes the user to waste time unkinking the hose. Extreme kinking may occur when, for example, a newly purchased coiled garden hose is initially used. At the time of initial use, a coupling at one end of the hose is fastened to a faucet. The user typically grasps the opposite end of the hose and move away from the faucet without allowing the coiled hose to untwist. Kinking also occurs after the initial use as a consequence of routine movements by the user.

When a hose kinks, water flow through the hose is blocked. The user must then attempt to remove the blockage by manual manipulation, such as by swinging the hose to relax the kink or approaching the kinked location and manually straightening the kink. Certain kinks may require the user to return to the faucet, shut off the flow at the faucet to release the fluid pressure in the hose, and then manually unkink the hose. The user suffers further inconvenience because he or she must walk back, reestablish the flow of water through the hose, and then return to the opposite end of the hose to continue use. An even more acute problem arises when the user has already attached a large sprinkler device, such as an oscillating sprinkler to the end, and is forced to untwist the hose with this device attached.

The tendency of flexible hoses to kink may be at least partially alleviated by winding a helical wrap about the exterior of the inner tubular conduit. However, because of the choice of construction materials for the wrap and conduit, such kink resistant hoses achieve enhanced flexibility by sacrificing crush resistance to an externally applied force. When these reinforced hoses are deformed, for example by walking on or driving over them with a car, the helical wrap tends to permanently deform. The permanent deformation restricts the fluid path. Another approach for increasing the kink resistance of flexible hoses is to increase the wall thickness of the tubular conduit. However, increasing the wall thickness sacrifices hose flexibility such that these hoses are more cumbersome for a user to handle and manipulate. Increasing the wall thickness also makes the hose heavier.

Thus, an improved hose construction is desired that is characterized by a suitable physical property combination of kink resistance, crush resistance, and burst resistance.

SUMMARY

The invention provides for a hose construction that is concurrently kink, crush, and burst resistant to an extent unachievable by conventional hoses. The hose is constructed of a tubular member and a reinforcement strip at least partially embedded inside a sidewall of the tubular member. The reinforcement strip may be wound in a helical pattern encircling the central lumen of the tubular body. The kink, crush, and burst resistance of the hose is optimized by selection of materials for the tubular body and reinforcement strip. In particular, the material forming the reinforcement strip has a greater initial modulus than the material forming the tubular member. The hose may be suitable for various different household and industrial applications.

The invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
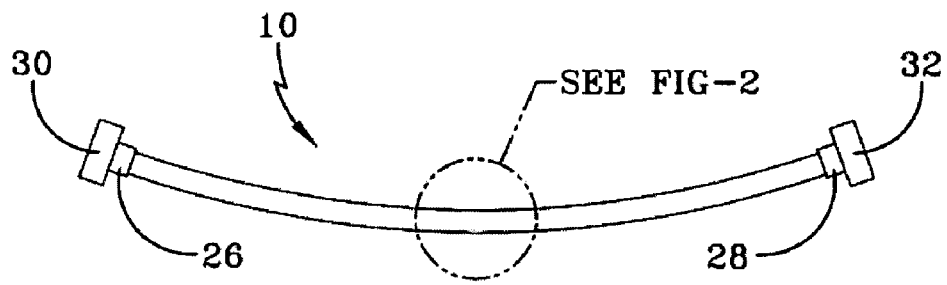
FIG. 1 is a perspective view of a hose constructed with a tubular member and a reinforcement strip wound about the tubular member in accordance with an embodiment of the invention.
Figure 2:
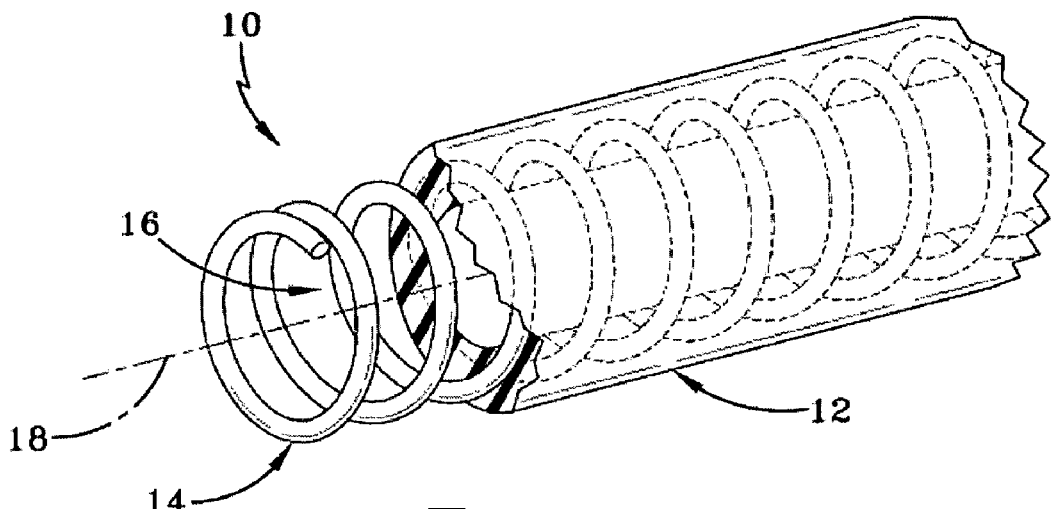
FIG. 2 is a perspective view of a portion of the hose of FIG. 1 in which the tubular member is partially removed to reveal the reinforcement strip.
Figure 3:
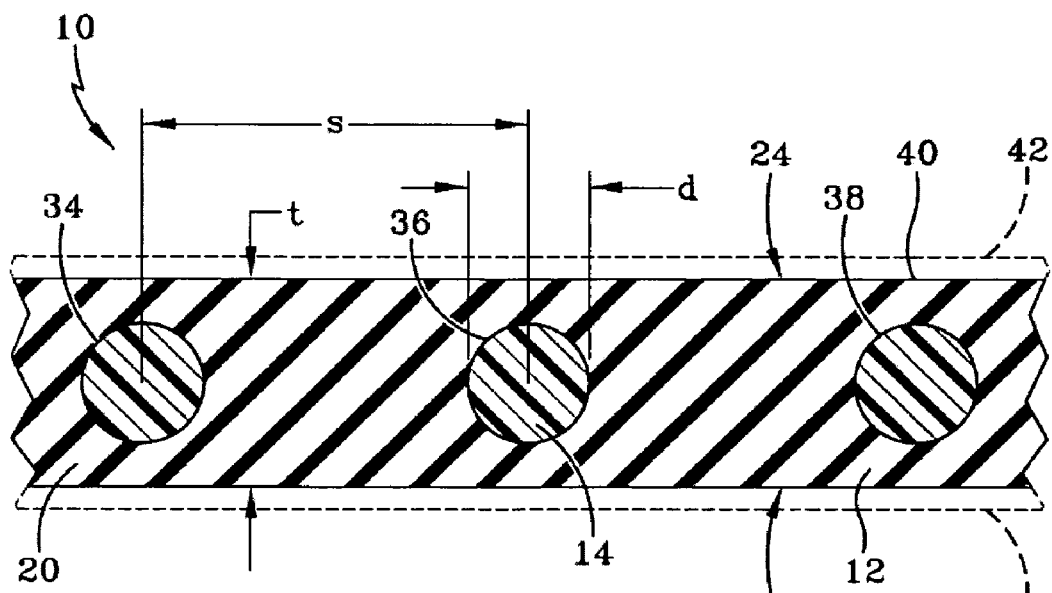
FIG. 3 is a cross-sectional view taken along a vertical section of FIG. 2.

With reference to FIGS. 1 through 3, a flexible hose 10 includes a tubular member 12 and a reinforcement strip 14 concentrically arranged about an open channel or lumen 16 extending along the length of the flexible hose 10. The reinforcement strip 14 is wound about a longitudinal axis 18 that is central to the lumen 16. The tubular member 12 includes an annular sidewall 20 with an inner and outer diameter separated by a wall thickness, t, which may vary along the axial length of the hose 10 because of the presence of the reinforcement strip 14 at least partially embedded within the sidewall 12. The tubular member 12 extends axially to an indefinite length along the central longitudinal axis 18. The inner and outer diameter dimensions and length dimension may vary depending upon the particular fluid conveying application involved.

The thickness, t, of the sidewall 20 is measured as a radial dimension between an interior or inner surface 22 of the inner diameter and an exterior or outer surface 24 of the outer diameter. The inner and outer surfaces 22, 24 define the boundaries of the sidewall 20. The inner surface 22, which borders and defines the lumen 16, is exposed to the fluid conveyed through the lumen 16 and is typically substantially smooth. The outer surface 24 is exposed to the working environment of the hose 10. Opposite ends 26, 28 of the flexible hose 10 are terminated by conventional hose fittings 30, 32, respectively, used for coupling the flexible hose 10 to a fluid source, a fluid drain, a fluid dispenser, or even another hose or conduit. The inner surface 22 of the tubular member 12 may have an inner diameter of, for example, ¼", ⅜", ½", ⅝", ¾", or 1".

The reinforcement strip 14 includes a plurality of continuous coils or turns, such as representative turns 34, 36, 38 (FIG. 3). The turns 34, 36, 38 are wound with a spiral or helical winding pattern having a helical pitch measured along the central longitudinal axis 18 such that adjacent pairs of turns 34, 36, 38 are non-contacting and, thereby, separated or spaced apart from each other by a center-to-center or centerline spacing, s. The centerline spacing, s, may range from about 110 percent to about 500 percent of the diameter, d, of the individual turns 34, 36, 38. The turns 34, 36, 38 of the reinforcement strip 14 may have a round geometrical shape depicted in FIGS. 2 and 3, an oval geometrical shape, a hexagonal geometrical shape, or another suitable geometrical shape. The interstitial spaces between adjacent turns 34, 36, 38 of the reinforcement strip 14 are filled by the material of the tubular member 12.

The cross-sectional area of the turns 34, 36, 38, as well as the helical pitch of the reinforcement strip 14, may influence the flexibility of the hose 10 and its strength against flattening and against pressure to resist bursting. Increasing the helical pitch of the reinforcement strip 14 in the axial direction increases the centerline spacing, s, which increases the flexibility of the hose, but may decrease the strength against flattening and pressure resistance against bursting. Increasing the cross-sectional area of the turns 34, 36, 38 increases the crush resistance against flattening but may reduce flexibility.

As best shown in FIGS. 2 and 3, the turns 34, 36, 38 of the reinforcement strip 14 may be completely encapsulated or embedded within the tubular member 12. In this instance, a continuous portion of the tubular member 12 comprises a thin outer skin or cover 40 that encases the turns 34, 36, 38 of the reinforcement strip 14 within the sidewall 20 and separates the turns 34, 36, 38 from the outer surface 24. Alternatively, the turns 34, 36, 38 of the reinforcement strip 14 may be partially exposed through the outer surface 24 of the sidewall 20. The material forming the tubular member 12 fills the spaces between adjacent turns 34, 36, 38 of the reinforcement strip 14.

An optional sheath layer 42 may be applied about the outer surface 24 of the tubular member 12 for the purpose of imparting abrasion resistance or chemical resistance. The construction material for the optional outer sheath 42 may comprise thermoplastic elastomer (TPE) or PVC added to hose 10 by, for example, a sequential extrusion process. In addition, an optional liner layer 44 may be applied on the inner surface 22 of the tubular member 12 by, for example, a sequential extrusion process. The liner layer 44 may be composed of a chemical-resistant material, such as rubber, that is chemically inert and resistant to permeation by the conveyed fluid in the lumen 16.

In one aspect, the reinforcement strip 14 comprises a high modulus material having a greater initial modulus than a low modulus material forming the tubular member 12. Because of the higher initial modulus, the high modulus material forming the reinforcement strip 14 has a greater rigidity (or lower flexibility) than the low modulus material forming the tubular member 12. As understood by a person having ordinary skill in the art, the initial modulus is a physical property of a material measured from the slope of an engineering stress-strain curve at low strain levels near zero strain. An engineering stress-strain curve is a graph representing an experimental measurement derived from measuring load (i.e., stress) versus extension (i.e., strain) for a sample of a material. The shape and characteristics of the stress-strain curve vary with the type of material. The stress-strain curve features an initial elastic region over an initial range of relatively low applied stresses, followed by a plastic region over another range of moderate applied stresses, and ultimately fracture at a sufficiently high applied stress.

The high modulus material of reinforcement strip 14 may be a TPE, a blend of two or more TPE's, a blend of TPE with polyethylene, or a blend of TPE with polypropylene. In particular, the high modulus material of reinforcement strip 14 may comprise a blend of a TPE and polypropylene having a composition ranging from about 80 percent by weight (wt. %) TPE to about 20 percent by weight TPE. A particularly useful polymer blend is believed to comprise a composition of about 50 percent by weight TPE and about 50 percent by weight polypropylene. Increasing the percentage by weight of polypropylene in the blend relative to percentage by weight of TPE is believed to increase the kink resistance of the hose 10, but reduce the flexibility. High modulus materials suitable for constructing the reinforcement strip 14 may comprise a blend of polypropylene and a TPE selected from the ENGAGE® family of TPE's commercially available from Dow Chemical Company (Midland, Mich.). A particularly useful polymer blend comprises ENGAGE® ENR™ 7256 ethylene-butene copolymer and polypropylene combined in a ratio of about 50 wt. % TPE to about 50 wt. % polypropylene, which has an initial modulus of about 40,000 psi. ENGAGE® ENR™ 7256 is characterized by a density of 0.885 grams per cubic centimeter (ASTM D792) and a melt mass flow rate of 0.80 grams per ten minutes (190° C./2.16 kg, ASTM D1238).

The high modulus material of reinforcement strip 14 is selected with a composition that exhibits a minimum initial modulus of about 5,000 pounds per square inch (psi). The high modulus material constituting reinforcement strip 14 may also exhibit a minimum tensile strength of about 1000 psi, or greater. The selected composition of the high modulus material of reinforcement strip 14 may also exhibit a zero or positive value of tangent modulus on the engineering stress-strain curve through a strain level of at least 20 percent as measured with a variation of ASTM standard D412 at crosshead speed of about two inches per minute. The tangent modulus is the slope of the engineering stress-strain curve at a given level of stress or strain. The tensile strength represents the stress at the inflection point or maximum on the engineering stress-strain curve, which corresponds to the maximum stress that can be sustained by a structure in tension. For applied stresses exceeding the tensile strength, the tangent modulus becomes negative because of permanent and non-recoverable deformation as the tested specimen extends. In one embodiment, the high modulus material of reinforcement strip 14 is characterized by an initial modulus of about 40,000 psi or more, a tensile strength of about 1600 psi or more, and a zero or positive value of tangent modulus on an engineering stress-strain curve through a strain level of at least 20 percent.

Although not wishing to be limited by theory, the relatively high initial modulus of the high modulus material of reinforcement strip 14 is believed to impart appreciable kink resistance to the hose 10. Although not wishing to be limited by theory, the minimum tensile strength of the high modulus material of reinforcement strip 14 is believed to impart appreciable burst strength to the hose 10. Although not wishing to be limited by theory, the positive tangent modulus of the high modulus material of reinforcement strip 14 is believed to impart appreciable crush resistance to the hose 10 by limiting the permanent deformation of the strip 14 in response to a crushing force tending to flatten the coils 34, 36, 38.

The low modulus material constituting the tubular member 12 is significantly more flexible than the high modulus material constituting the reinforcement strip 14. In one aspect, the low modulus material constituting the tubular member 12 exhibits a maximum initial modulus of about 3000 psi and, typically an initial modulus between about 200 psi and about 3000 psi. In one embodiment, the initial modulus of the low modulus material may range from about 600 psi to about 1,000 psi. The minimum stress at 250 percent strain of the low modulus material may be about 400 psi and, in certain embodiments, the stress at 250 percent strain may range from about 750 psi to about 1250 psi.

The low modulus material constituting the tubular member 12 may be a polymer such as TPE, a blend of two or more TPE's, or polyvinylchloride (PVC), although the invention is not so limited. Low modulus materials suitable for constructing the tubular member 12 may be a TPE selected from the family of polyolefin elastomers commercially available under the trade name ENGAGE® from Dow Chemical Company (Midland, Mich.). A particularly useful TPE for forming tubular member 12 is ENGAGE® 8180 polyolefin elastomer, which is an ethylene-octene copolymer characterized by a density of 0.863 grams per cubic centimeter (ASTM D792) and a melt mass flow rate of 0.50 grams per ten minutes (190° C./2.16 kg, ASTM D1238).

In certain embodiments, one or more conventional additives, such as a crosslinking agent, may be added to either the low modulus material of tubular member 12 or the high modulus material of the reinforcement strip 14. For example, silane may be added as a crosslinking agent to the low modulus material constituting the tubular member 12. In particular, the low modulus material of tubular member 12 may comprise a blend of ENGAGE® 8180 with the crosslinking agent SILCAT® RHE silane, which is a crosslinking vinylsilane agent commercially available from General Electric Advanced Materials (Wilton, Conn.). Depending upon the composition, the addition of SILCAT® RHE silane provides an initial modulus of approximately 600 psi to 1000 psi and a stress at 250 percent strain of 750 psi to 1250 psi.

In an alternative embodiment, the low modulus material of the tubular member 12 may be foamed to reduce the weight and increase the flexibility of the hose 10. The blowing agent works by expanding the low modulus material of the tubular member 12 to produce a cellular structure having significantly less density than the polymer itself. The foamed structure may be achieved by introducing a conventional blowing agent into the low modulus material of tubular member 12 during extrusion. The blowing agent may be any chemical agent that liberates gas when heated above a characteristic decomposition temperature (e.g., sodium bicarbonate that liberates $CO_2$ when heated above its decomposition temperature), any physical agent such as any gas (e.g., gaseous nitrogen or carbon dioxide), or any other known type of blowing agent. As the low modulus material of the tubular member 12 cools and hardens, gas-filled bubbles originating from the blowing agent define a closed cellular structure of a given density throughout the tubular member 12.

The combination of a low modulus material for the tubular member 12 and a high modulus material for the reinforcement strip 14 is selected to construct a hose 10 that, in comparison with conventional hose constructions, exhibits acceptable flexibility, kink resistance, and crush resistance under zero- and low-fluid pressure conditions without sacrificing strength that resists bursting. In certain embodiments of the invention, the materials for the tubular member 12 and reinforcement strip 14 may be selected to operate under internal working fluid pressures ranging from about 15 psi to about 500 psi.

The hose 10 may be manufactured or fabricated using extrusion techniques known to a person having ordinary skill in the art. For example, one extrusion technique involves feeding a continuous extruded body of molten material tangentially relative to a rotating cylindrical mandrel. The molten extruded body, before contacting the rotating mandrel, consists of an outer shell of the low modulus material of the tubular body 12 and an inner core of the high modulus material of the reinforcement strip 14. As the extruded body contacts the rotating mandrel, the molten extruded body coils in a multiplicity of successive loops about the circumference of the mandrel. Confronting edges of adjacent loops merge or fuse together in the molten state to form a continuous and integral tubular body or mass in which the inner core remains segregated from the outer shell. When cooled, the tubular body 12 and reinforcement strip 14 are defined from the outer shell and the inner core, respectively, as a continuous length of tubing defining hose 10 without additional processing steps. The tubing is cut to length and the hose fittings 30, 32 are attached.

The high modulus and low modulus materials constituting the reinforcement strip 14 and tubular member 12, respectively, are compatible in that they mutually adhere together to create a cohesive, strongly bonded integral composite structure. An intermediate tie or bonding layer (not shown), which may be co-extruded between the outer shell and inner core, may be formed of a material that is adhesion bond compatible with both the materials of reinforcement strip 14 and tubular member 12.

Hose 10 may be adapted for use in a wide variety of industrial or household applications. One commercial application for hose 10 is a garden or water hose for household or industrial use. Another commercial application for hose 10 is a drop hose mainly used for the transfer of various fluids including, but not limited to, gasoline, petroleum based products, chemicals, petrochemicals, and fluid food products. Hose 10 may be also used to make pneumatic hoses for pneumatic tools and the like.

Figure 4:
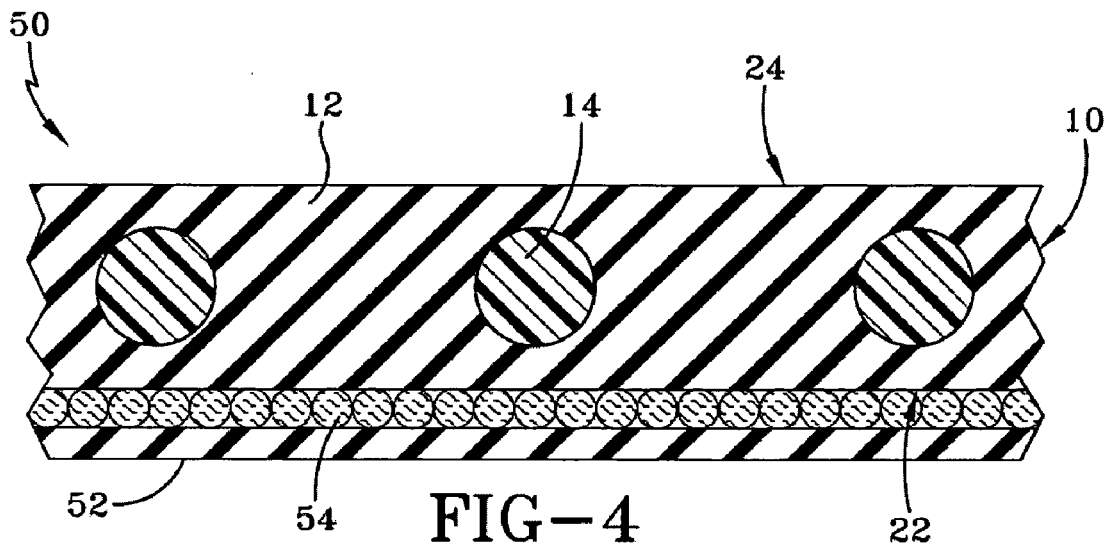
FIG. 4 is a cross-sectional view similar to FIG. 3 of a hose in accordance with an alternative embodiment of the invention.

With reference to FIG. 4 and in accordance with an alternative embodiment of the invention, a hose 50 includes hose 10 with tubular member 12 and reinforcement strip 14, a tubular member 52 formed from a low modulus material, and a layer 54 of yarn arranged radially between the tubular members 12, 52. The added yarn layer 54 is believed to increase the burst strength of hose 50, in comparison with hose 10 (FIGS. 1 through 3), and may be used for operating hose 50 at a working fluid pressure as high as about 500 psi (i.e., 2000 psi burst strength). The yarn layer 54 may comprise a knit fabric, a spiral or continuous strand helically wound about the inner tubular member 52 as shown in FIG. 4, or a braided fabric. The yarn layer 54 may be composed of any suitable material, such as polyester, nylon, rayon, aramid, carbon fiber, ceramic fibers such as silicon carbide, polyvinyl alcohol (PVA), Poly p-phenylene-2,6-bezobisoxazole (PBO) or polypropylene, as understood by a person having ordinary skill in the art, and may have the form of a monofilament or a multi-filament material.

In the hose construction of hose 50, the yarn layer 54 and inner tubular member 52 are disposed radially inside of the inner surface 22 of tubular layer 12. The yarn layer 54 is disposed radially between the tubular member 12 and inner tubular member 52. After the tubular member 52 is formed, the yarn layer 54 is applied about tubular member 52 before the extrusion forming hose 10 is applied about the exterior of the yarn layer 54.

Figure 5:
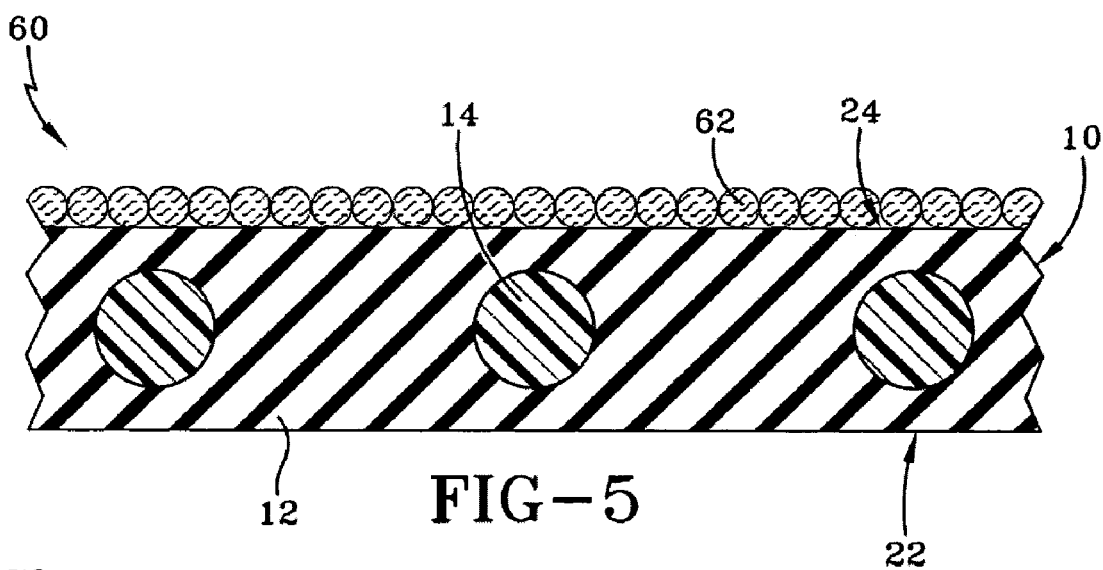
FIG. 5 is a cross-sectional view similar to FIGS. 3 and 4 of a hose in accordance with an alternative embodiment of the invention.

With reference to FIG. 5 and in accordance with an alternative embodiment of the invention, a hose 60 include's a layer 62 of yarn added about the outer surface 24 of hose 10 (FIGS. 1 through 3). The yarn layer 62 may be constructed as described above with regard to yarn layer 56 (FIG. 4). The yarn layer 62 is disposed radially outside of the outer surface 24. In the hose construction of hose 60, the yarn layer 62 is applied about outer surface 24 after the hose 10 is formed.

Figure 6:
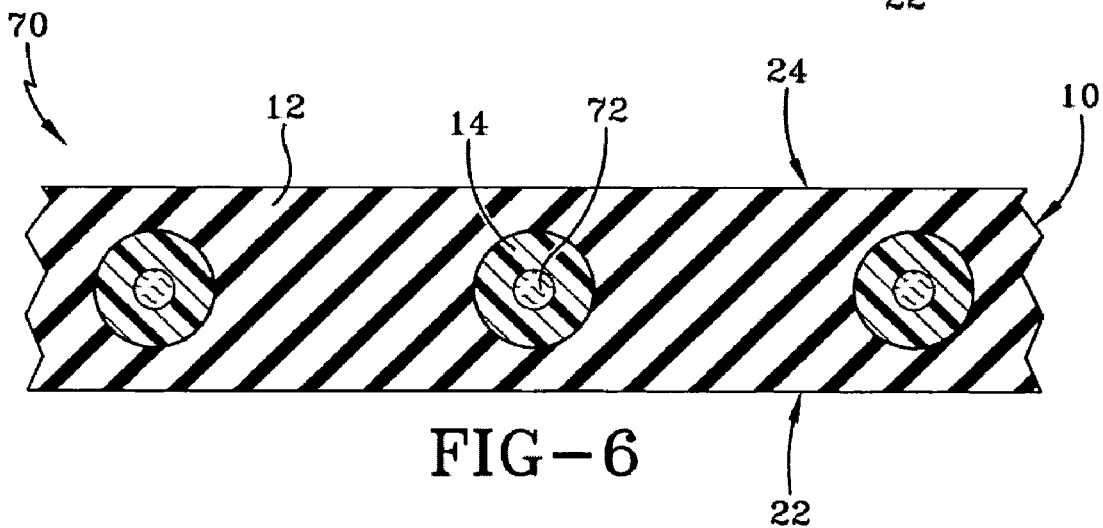
FIG. 6 is a cross-sectional view similar to FIGS. 3 through 5 of a hose in accordance with an alternative embodiment of the invention.

With reference to FIG. 6 and in accordance with an alternative embodiment of the invention, a hose 70 includes a strand 72 of yarn added as a core inside the reinforcement strip 14. The material constituting yarn strand 72 may be a continuous monofilament or a multi-filament strand of polyester, nylon, rayon, aramid, polypropylene, or another suitable material. In the hose construction of hose 70, the yarn strand 72 may be combined with the shell and core such that the yarn strand 72 resides inside the reinforcement strip 14 after the extrusion process.

In other embodiments, one or both of the high modulus material of the reinforcement strip 14 or the low modulus material of the tubular member 12 may comprise an ethylene/α-olefin block interpolymer as disclosed in U.S. Publication 2006/0199930, fully incorporated herein by reference in its entirety. In one embodiment, the high modulus material of the reinforcement strip 14 comprises an ethylene/1-butene interpolymer. In one embodiment, the low modulus material of the tubular member 12 comprises an ethylene/1-octene interpolymer. Thus, ethylene-butene copolymers disclosed herein for use in the reinforcement strip 14 include the ethylene/1-butene interpolymers disclosed in U.S. Publication 2006/0199930, and ethylene-octene copolymers disclosed herein for use in the tubular member 12 include the ethylene/1-octene interpolymers disclosed in U.S. Publication 2006/0199930.

Further information on ethylene/α-olefin block interpolymers may be found in the following publications: A. Hilter et al., *Solid State Structure and Properties of Novel Olefin Block Copolymers*, presented at ANTEC 2006, SPE Annual Technical Conference, May 7-11, 2006, Charlotte, N.C.; S. Karande et al., *Unique Material Properties and Potential Applications of Novel Olefin Block Copolymers*, presented at ANTEC 2006; K. Swogger et al., *The Development of A New Generation of Novel Olefin Block Copolymers: From Molecular Design to Market Development*, presented at ANTEC 2006; D. Arriola, et al., *Catalytic Production of Olefin Block Copolymers via Chain Shuttling Polymerization, Science* 312, No. 5774 (May 5, 2006), Pages 714 through 719; S. Ritter, *Polyolefin Shuffle, Chem. Eng. News* 84: 19 (May 8, 2006), Page 9

Portions of U.S. Publication 2006/0199930 are reproduced herein. As disclosed in U.S. Publication 2006/0199930 at paragraph [0031], the term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

As disclosed in U.S. Publication 2006/0199930 at paragraphs [0039] to [0046], the ethylene/α-olefin interpolymers are characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF (i.e., fractionation of a polymer by Temperature Rising Elution Fractionation) from 20° C. and 110° C., with an increment of 5° C. (although other temperature increments, such as 1° C., 2° C., 10° C., also can be used):

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction. For each polymer fraction, BI is defined by one of the two following equations (both of which give the same BI value):

$$BI = \frac{1/T_X - 1/T_{XO}}{1/T_A - 1/T_{AB}} \text{ or } BI = \frac{LnP_X - LnP_{XO}}{LnP_A - LnP_{AB}}$$

where $T_X$ is the ATREF (i.e., analytical TREF) elution temperature for the ith fraction (preferably expressed in Kelvin), $P_X$ is the ethylene mole fraction for the ith fraction, which can be measured by NMR or IR. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the inventive copolymer. $T_{AB}$ can be calculated from the mole fraction of ethylene (measured by NMR) using the following equation:

$$LnP_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$LnP = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from $LnP_X = \alpha/T_{XO} + \beta$ from a measured $P_X$ mole fraction. Conversely, $P_{XO}$ is the ethylene mole fraction for a random copolymer of the same composition (i.e., the same comonomer type and content) and the same molecular weight and having an ATREF temperature of $T_X$, which can be calculated from $Ln P_{XO} = \alpha/T_X + \beta$ using a measured value of $T_X$.

Once the block index (BI) for each preparative TREF fraction is obtained, the weight average block index, ABI, for the whole polymer can be calculated. In some embodiments, ABI is greater than zero but less than about 0.4 or from about 0.1 to about 0.3. In other embodiments, ABI is greater than about 0.4 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

As disclosed in U.S. Publication 2006/0199930 at paragraphs [0084] to [0101], the process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/566,2938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising: the admixture or reaction product resulting from combining: (A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent. Representative catalysts and chain shuttling agent are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, U.S. Pat. No. 6,953,764 and No. 6,960,635, and WO 04/24740.

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, U.S. Pat. No. 6,953,764 and No. 6,960,635, and WO 04/24740.

Catalyst (A3) is bis[N,N'''-(2,4,6-tri(methylphenyl)amido)ethylenediamine]hafnium dibenzyl.

Catalyst (A4) is bis((2-oxoyl-3-(dibenzo-1H-pyrrole-1-yl)-5-(methyl)phenyl)-2-phenoxymethy-1)cyclohexane-1,2-diyl zirconium (IV) dibenzyl, prepared substantially according to the teachings of U.S. Pat. No. 6,897,276.

Catalyst (B1) is 1,2-bis-(3,5-di-t-butylphenylene)(1-(N-(1-methylethyl)immino)methyl)(2-oxoyl)zirconium dibenzyl.

Catalyst (B2) is 1,2-bis-(3,5-di-t-butylphenylene)(1-(N-(2-methylcyclohexyl)-immino)methyl-)(2-oxoyl)zirconium dibenzyl.

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444.

Catalyst (C2) is (t-butylamido)di(4-methylphenyl)(2-methyl-1,2,3,3a,7a-η-inden-1-yl)silanetitanium dimethyl prepared substantially according to the teachings of U.S. Pat. No. 6,825,295.

Catalyst (C3) is (t-butylamido)di(4-methylphenyl)(2-methyl-1,2,3,3a,8a-η-s-indacen-1-yl)silanetitanium dimethyl prepared substantially according to the teachings of U.S. Pat. No. 6,825,295.

Catalyst (D1) is bis(dimethyldisiloxane)(indene-1-yl)zirconium dichloride available from Sigma-Aldrich.

The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

As disclosed in U.S. Publication 2006/0199930 at paragraph [0106], the ethylene/α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

Suitable interpolymers of ethylene and α-olefin may be obtained as the INFUSE™ series of olefin block copolymers from The Dow Chemical Company.

References herein to terms such as "inner" or "interior" and "outer" or "exterior" refer, respectively, to directions toward and away from the center of the referenced element, and the terms "radial" and "axial" refer, respectively, to directions perpendicular and parallel to the longitudinal central axis of the referenced element are made by way of example, and not by way of limitation, to establish a frame of reference. It is understood that various other reference frames may be employed for describing the invention.

The embodiments described above may be further appreciated with consideration of the following example.

EXAMPLE

Figure 7:
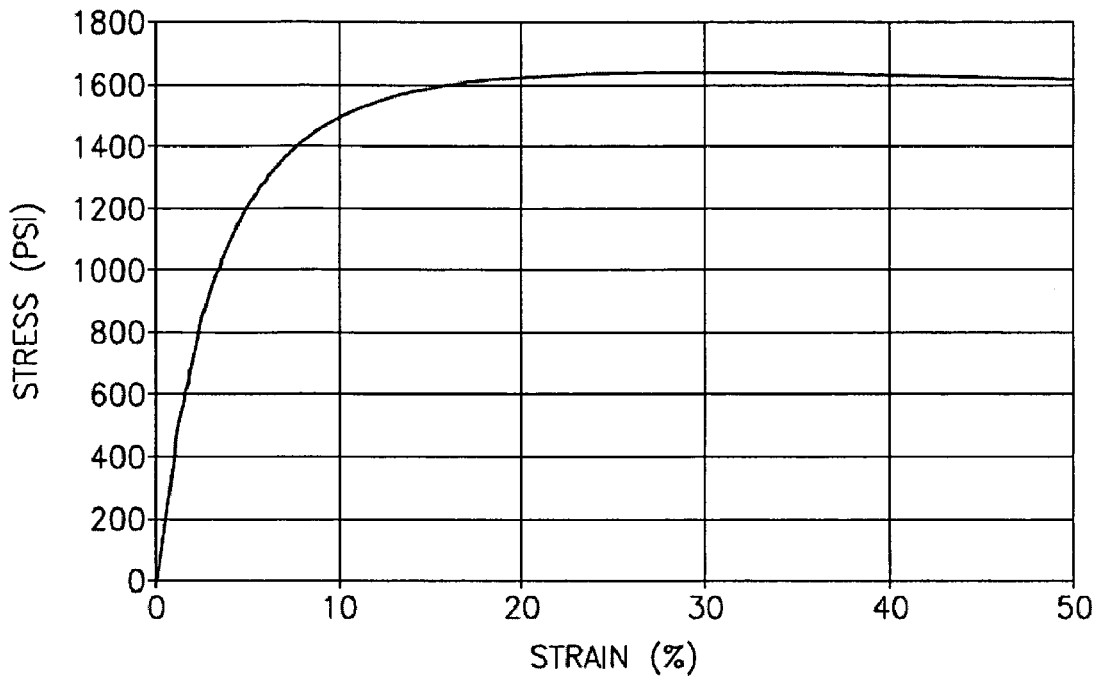
FIG. 7 is an engineering stress-strain curve for a representative rigid material useable for constructing the reinforcement strip of the hose of FIGS. 1 through 3.
Figure 8:
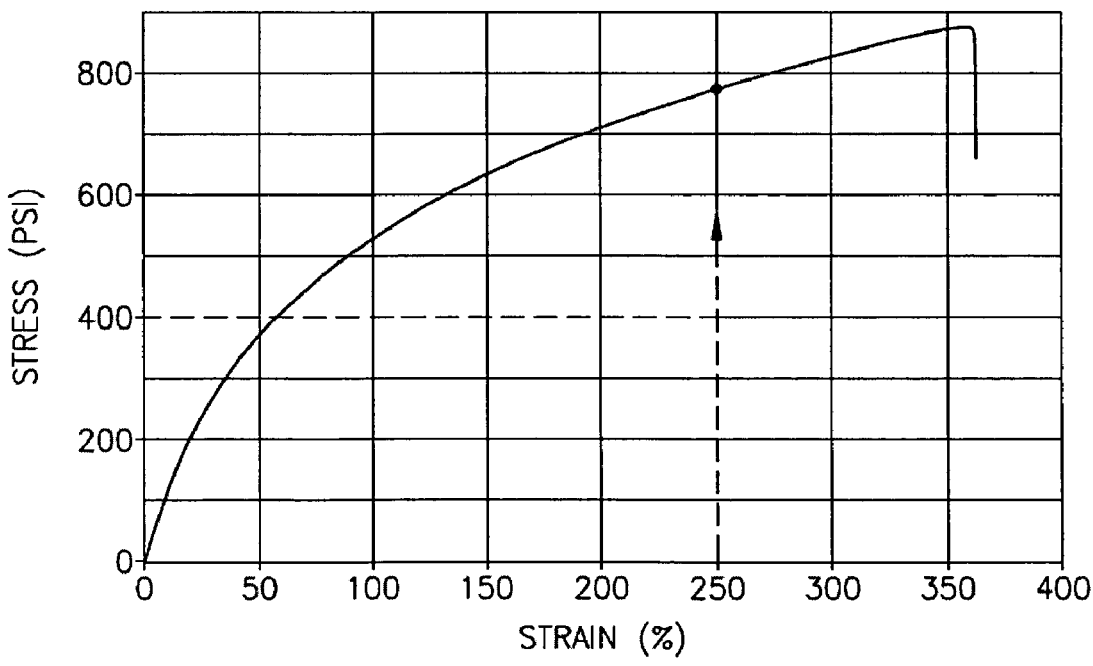
FIG. 8 is an engineering stress-strain curve for a representative flexible material useable for constructing the inner tubular member of the hose of FIGS. 1 through 3.

The properties of candidate high modulus and low modulus materials for a flexible hose as described herein were tested. The candidate high modulus material for the reinforcement strip 14 was selected to be ENGAGE® ENR™ 7256 and polypropylene blended in a nominal ratio of about 50 percent by weight TPE to about 50 percent by weight PP. As indicated in FIG. 7, the blended material was measured an initial modulus of about 40,000 psi, a zero or positive tangent modulus at 20 percent strain, and a tensile strength of 1,600 psi. The candidate low modulus material of the tubular member 12 was selected to be ENGAGE® 8180 with the crosslinking agent SILCAT® RHE silane. As shown in FIG. 8, the initial modulus is about 750 psi and the stress at 250 percent strain is about 770 psi. With this combination of physical properties, a flexible hose constructed from these materials is predicted to burst at a minimum fluid pressure of about 300 psi.

To generate the engineering stress-strain curves of FIGS. 7 and 8, dumbbell shaped test specimens (Die C per ASTM 412) of the two materials comprising the flexible hose were tensile tested on a United tensile test machine at a speed of 2 inches per minute for the high modulus material and on an Instron tensile test machine a speed of 20 inches per minute for the low modulus material. All testing was conducted with the test specimens at room temperature.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicants' general inventive concept. The scope of the invention itself should only be defined by the appended claims, wherein we claim:

What is claimed is:

1. A hose comprising:
    a tubular member comprising a sidewall aligned along a longitudinal axis and a lumen radially inside said sidewall, said tubular member comprising an ethylene-octene interpolymer comprising polymerized units of ethylene and 1-octene, wherein the interpolymer is characterized by an average block index greater than zero and up to about 1.0 and a molecular weight distribution, $M_w/M_n$, greater than about 1.3; and
    a helical reinforcement strip at least partially embedded within said sidewall of said tubular member and helically wound with a pitch about said lumen of said tubular member, said reinforcement strip comprising a blend of polypropylene and an ethylene-butene interpolymer of ethylene and 1-butene, where the ethylene-butene interpolymer is characterized by an average block index greater than zero and up to about 1.0 and a molecular weight distribution, Mw/Mn, greater than about 1.3.

2. The hose of claim 1 wherein said tubular member further crosslinking vinylsilane agent.

3. The hose of claim 1 wherein the helical reinforcement strip contains from 20 weight percent to 80 weight percent of said ethylene-butene interpolymer, and with the balance of the helical reinforcement strip constituting polypropylene.

4. The hose of claim 1 wherein said sidewall is bounded between an inner surface and an outer surface radially outward of said inner surface, and further comprising:
    a tubular yarn layer radially inside said inner surface; and
    a tubular conduit radially inside said yarn layer, said tubular conduit bordering said lumen.

5. The hose of claim 1 wherein said sidewall is bounded between an inner surface and an outer surface radially outward of said inner surface, and further comprising: a tubular yarn layer radially outside of said outer surface.

6. The hose of claim 1 further comprising:
    a continuous strand of yarn inside said reinforcement strip.

7. The hose of claim 1 wherein said first polymer comprises a closed-cell foam.

8. The hose of claim 1, wherein the ethylene-octene interpolymer has an initial modulus of about 3,000 psi or less, and the helical reinforcement strip has a zero or positive tangent modulus value up to a strain level of about 20 percent and an initial modulus of about 5000 psi or more.

9. The hose of claim 1 wherein said ethylene-octene interpolymer has a minimum stress of about 400 psi at a 250 percent strain.

10. The hose of claim 1 wherein said helical reinforcement strip has a tensile strength of about 1000 psi or more.

11. The hose of claim 1 wherein said initial modulus of said helical reinforcement strip is about 40,000 psi or more.

12. The hose of claim 11 wherein said helical reinforcement strip has a tensile strength of about 1600 psi or more.

13. The hose of claim 1 wherein said initial modulus of said ethylene-octene interpolymer ranges from about 600 psi to about 1,000 psi, and said ethylene-octene interpolymer has a stress at 250 percent strain ranging about 750 psi to 1250 psi.

14. The hose of claim 1 wherein the tubular member consists essentially of an ethylene-octene interpolymer and a crosslinking vinylsilane agent.

15. The hose of claim 1 wherein helical reinforcement strip is wound with a spiral winding pattern having a helical pitch such that adjacent pairs of turns are non-contacting.

16. The hose of claim 15 wherein the helical pitch of the spiral winding pattern is such that adjacent pairs of turns of the helical reinforcement strip have a centerline spacing which is within the range of 110 percent to 500 percent.

17. The hose of claim 1 wherein the outer surface of said hose is substantially smooth.

* * * * *